Feb. 15, 1949.　　　D. P. LAVIETES　　　2,461,905

SMOKER'S PIPE

Filed Jan. 25, 1946

INVENTOR
David P. Lavietes
BY
ATTORNEY

Patented Feb. 15, 1949

2,461,905

UNITED STATES PATENT OFFICE 2,461,905

SMOKER'S PIPE

David P. Lavietes, Boone, N. C.

Application January 25, 1946, Serial No. 643,297

5 Claims. (Cl. 131—225)

The invention relates to smokers' pipes and more particularly to smokers' pipes having a screw threaded connection between the bit or mouthpiece and the shank of the pipe bowl to form a gas and moisture tight joint between these parts and yet allow the bit to be turned to correct any departure from a desired position of the bit relative to the bowl, or "over-turning" of the bit, as a result of lack of accuracy of, or wear upon, the connecting parts.

In smoking a pipe, there is always developed a certain amount of moisture which is precipitated and accumulated within the shank or the bit in volume to require frequent removal of the bit and cleaning of parts. To prevent seepage of the precipitate about the joint between the shank and the bit and the fouling of the fingers of the user, a gas and liquid tight joint between the abutting ends of the shank and the bit is necessary.

Generally speaking, two practices have been followed in securing a bit or mouthpiece to the bowl shank; one the use of a "push bit" in which a tenon is formed integrally with or mounted upon the end of the bit and a socket is formed in the end of the bowl shank; the other the use of a screw threaded tenon formed integrally with, or mounted upon the end of the bit, and a complementary screw threaded socket formed in the end of the shank.

While with a "push bit" it is possible to make any desired adjustment of the bowl and the bit, it is so difficult to secure a tight, non-seeping joint that a liner for the shank socket of cork or other resilient material is resorted to, but such a liner is apt to break down after a short use of a pipe following frequent removal and replacement of the bit, with a consequent loss of tightness in the fit between the tenon and the liner.

With a bit having a screw-threaded connection with the shank of a pipe, a tight fit may be secured if the parts are accurately fitted although slight dimensional variations or wear upon the screw threads may result in a looseness of parts resulting in seepage of moisture or an overturning of the bit in an effort to correct this looseness. Such overturning of the bit causes a loss in the desired relative position of the bowl and the bite of the bit or mouthpiece.

With the above condition in mind, I have produced a smoker's pipe wherein the bit is removably secured to the shank of the bowl by a screw threaded connection, the action of which forms a tight joint between the end of the shank and the abutting end of the bit irrespective of slight dimensional variation in the parts, or wear thereon, even though in securing such joint, there may be overturning of the bit.

In a pipe embodying my invention, the bit may be turned in one direction independently of the screw threads so as to correct any overturning thereof in securing a gas and moisture tight joint and to permit the bit to be positioned to establish any desired relation of the axis of the bowl to that of the flattened portion of the bit adjacent its bite, according to the habits or the fancy of, or the tilting of the pipe as a whole due to tooth irregularities of, the user.

Such adjustment may be made without disturbing the tight fit between the bit and the shank, and the construction is such that all parts may be standardized so as to permit the replacement of a broken bit and yet maintain the same conditions of operation of the pipe.

The invention consists primarily in a smoker's pipe embodying therein a bowl having a shank or stem provided with a socket opening outwardly thereof and a smoke passage leading therefrom, a bit having a flattened bite, and a connection between said shank and said bit consisting of a part having an interiorly screw threaded socket in the stem and a joint part rotatively secured in the bit and having an exteriorly screw threaded tenon whereby the bit is removably connected with a shank, one of the parts of said connection being fixedly connected to one of the pipe parts and the other part of the connection of the joint part with the bit permitting overturning of the bit relatively to the bowl independently of said screw threads, but does not permit removal of the joint part from the bit.

In order to positively and yet frictionally secure the joint part in the bit, a special but simple method of construction has been devised as will be more fully understood from the accompanying drawings and specification.

Figure 1:
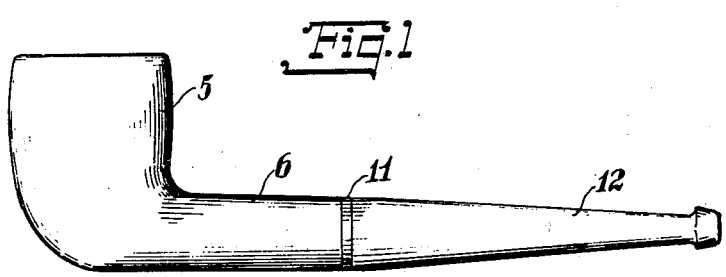
Fig. 1 is a side view of one form of pipe embodying my invention.
Figure 2:
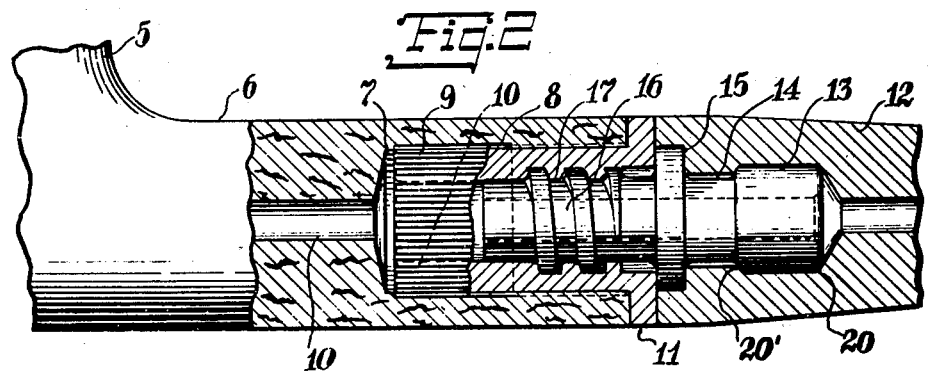
Fig. 2 is a longitudinal sectional view showing the connection between the bowl stem and the bit on an enlarged scale.
Figure 3:
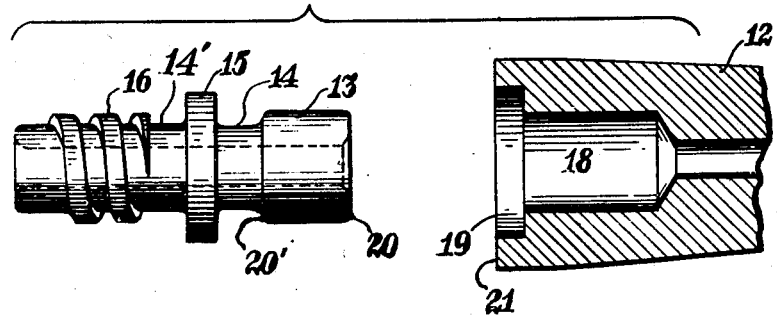
Fig. 3 shows a side view of the joint member and a section of the bit ready for assembly on the same scale as Fig. 2.
Figure 4:
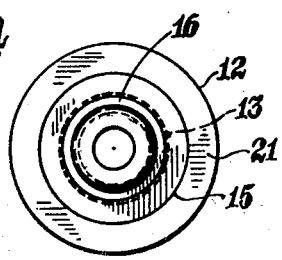
Fig. 4 is an end view of the bit with the joint member in place.

The bowl 5 of suitable design has a shank or stem 6. A longitudinal recess or bore, 7 is formed in the shank or stem to receive the tubular metallic sleeve 8. To prevent the sleeve from turning in the stem, the sleeve may have a serrated portion 9 driven into the recess. A smoke passage or bore 10 extends from the bowl through the entire length of the pipe. The shank or stem of the bowl is finished off with a flange 11 on the end of the sleeve.

The bit 12 is formed of a moldable plastic material such as vulcanized rubber or Bakelite in which is mounted a tenon or joint member. This joint member is preferably formed of a single piece of metal and consists of the head 13, the restricted neck or reduced portion 14, the flange 15 and the screw threaded extension 16, all of its surfaces being smooth so that the joint member may turn friction-tight in the bit and the screw threaded part 16 can turn easily in the helical recess or screw threaded interior 17 of the sleeve. The screw-threaded extension 16 is reduced at 14' adjacent the flange 15.

In order to be able to assemble the joint member in the end of the bit, the bit is provided with a recess 18 having a groove 19 around its entrance. This recess 18 is a little smaller in diameter than the external diameter of the head 13, and the diameter of the groove 19 is the same as the diameter of the flange 15. To insert the head of the joint member into the bit, the bit is heated so as to soften the composition and the head of the joint member is heated so as to avoid chilling the bit. The material of the bit yields and permits the rounded corner 20 of the head 13 to slide into the recess, the walls of which yield and then flow back around the shoulder 20' and into the space around but out of contact with the restricted neck 14 thus interlocking with the shoulder 20' so as to permanently secure the joint member to the bit. When the parts cool the joint member is held friction-tight so that the bit can be turned by the application of considerable force. After the joint member is inserted in the bit, the latter may be finished or smoothed on the outside.

It will be seen that an integral portion of the material of the mouthpiece or bit frictionally embraces the enlarged head 13 and extends into the space around the neck 14 but is radially spaced from the neck.

The head of the joint member is held sufficiently tight in the bit so that the threaded part 16 can be screwed into the socket 17 of the sleeve by turning the bit in this instance, right-handed. If the angle of the bit is not satisfactory when the flange 15 is tightened against the flange 11 of the sleeve, the bit can be overturned to the desired angle by reason of the slipping of the friction seating of the head and flange of the joint member in the bit.

It is preferred that the depth of the groove 19 be equal to the thickness of the flange 15 so that when the bit is screwed into the sleeve 8 the rim 21 around the flange 15 will engage the rim of the flange 11 of the sleeve and leave no opening. The flanges 11 and 15 coact to prevent leakage between the bit and the shank of the bowl.

To unscrew the bit from the stem, it is merely necessary to turn the bit backwardly, in this case, left-handed, the friction of the bit on the joint member being greater than the friction of the joint member against the flange 11 and in the screw threaded socket.

Although the joint member is preferably secured in the bit as above described, it may be inserted in a recess of proper size in the bit while cold and the bit then softened if necessary and compressed around the head of the joint member so as to secure the parts together and yet permit the bit to be turned for adjustment on the joint member.

The tubular sleeve 8 constitutes a "first connector" and the tubular member having the friction head 13, shoulder 15, reduced neck 14 and helical screw thread constitute a "second connector."

I claim:

1. In a pipe having a bowl and shank and a mouthpiece wherein the shank has a bore, a connector for the shank and mouthpiece comprising a flanged sleeve having a bore aligned with the shank bore and provided at one end thereof with a bore of larger diameter than the shank bore and a helical recess extending inwardly from said latter bore, a second connector of unitary construction having an enlargement substantially at the center thereof, reduced portions on opposite sides of the enlargement, a threaded portion extending from one reduced portion to the free end of the unit, and a smooth-surfaced portion of greater diameter than the other reduced portion extending from the latter, the reduced portions having cross-sectional dimensions less than the cross-sectional dimensions of the threaded portion and the smooth-surfaced portion, said mouthpiece having a bore provided with a recess at one end to receive the enlargement, the mouthpiece bore adjacent the recess being of a diameter so as to space the same radially from the reduced portion and said mouthpiece having adjacent the latter bore a bore of greater diameter and of substantially the same length as the smooth-surfaced portion, whereby the mouthpiece is immovable from the second connector and when in position on the second connector and with the second connector threaded in the first connector will provide a pipe joint permitting the mouthpiece to be rotated relative to the first connector while maintaining the second connector in fixed relation with the bowl shank and first connector, said first and second reduced portions being in non-frictional, non-contacting relation with adjacent portions of said first connector and mouthpiece, respectively.

2. A smoking pipe comprising a bowl with a shank and a mouthpiece formed of hard material and means for connecting the mouthpiece to the shank of the bowl consisting of two connector members, the first connector member being in the form of a metallic sleeve fixed to the shank of the bowl, the second connector member being in the form of a metallic tube having an enlarged smooth-surfaced portion frictionally embedded in the mouthpiece, one of said connection members having an internal helical screw thread and the other connector member having an external screw threaded extension fitted into said internal screw thread, said second connector having a shoulder abutting against a part of the first connector when the connector members are screwed together, said second connector member having a reduced neck adjacent said enlarged portion and of less diameter than said enlarged portion, the material of said mouthpiece surrounding said reduced neck being spaced radially therefrom, the internal diameter of said material surrounding said neck being less than the diameter of said enlarged portion and larger than the diameter of said neck.

3. A smoking pipe having a bowl with a shank provided with a smoke passage and a mouthpiece provided with a smoke passage, and means for detachably connecting the mouthpiece to the shank, comprising a first tubular metallic connector member fixed to the shank and a second tubular metallic connector member having a smooth-surfaced portion frictionally embedded in the mouthpiece and having a flange at the end of the mouthpiece, one face of the flange being flush with an end face of the mouthpiece, and a neck of reduced diameter between said flange and said smooth-surfaced portion, said mouthpiece having a portion surrounding said neck between said smooth-surfaced portion and said flange but of larger diameter than said neck for preventing withdrawal of said second connector member from said mouthpiece, one of said connector members having an internal helical screw thread and the other connector member having an external screw threaded extension fitted to said internal screw thread, said flange abutting against said first connector member when the screw threads of said members are connected, the friction between the connected parts being such that the mouthpiece can be connected to the shank of the bowl by turning the mouthpiece in one direction and can be overturned when the flange is seated against the first connector member and the mouthpiece can be unscrewed by turning the mouthpiece in the opposite direction.

4. A smoking pipe comprising a bowl with a shank and a mouthpiece formed of hard material and means for connecting the mouthpiece to the shank of the bowl consisting of two connector members, the first connector member being in the form of a metallic sleeve adapted to be rigidly secured to the shank of the bowl and having an interior helical screw thread, the second connector member being in the form of a metallic tube having an enlarged smooth-surfaced head at one end frictionally embedded in the mouthpiece and a helically screw threaded portion at the other end extending from the mouthpiece and screwed into the said sleeve, said second connector having a shoulder abutting against a part of the first connector when the second connector is screwed into the first connector and having a reduced neck adjacent said enlarged head of less diameter than said head, the material of said mouthpiece surrounding said reduced neck and spaced radially therefrom, the internal diameter of said material on each side of the enlarged head being less than the diameter of said head and larger than the diameter of said neck.

5. A mouthpiece and connector fitting for a smoking article of the type having a shank comprising a mouthpiece having a bore, a tubular metallic connector having a smooth surfaced head frictionally embedded in a part of the said bore near one end of the mouthpiece, an outwardly projecting flange at said end of the mouthpiece adapted to abut against the outer end of a shank of said article, said connector having a reduced neck between said flange and said head, said mouthpiece having an integral portion surrounding said neck and of larger diameter than said neck but smaller in diameter than said head for preventing withdrawal of said connector from said mouthpiece and spaced radially from said neck to permit rotation of said mouthpiece on the connector when the connector is screwed into the shank, said connector having a helically screw-threaded portion to receive a complementary threaded portion of the shank.

DAVID P. LAVIETES.

REFERENCES CITED

The following references are of record in the file of this patent:

UNITED STATES PATENTS

| Number | Name | Date |
| --- | --- | --- |
| 1,541,346 | Goldvogel | June 9, 1925 |
| 1,593,677 | Gernee et al. | July 27, 1926 |
| 2,262,159 | Lavietes | Nov. 11, 1941 |
| 2,326,658 | Koenigsamen | Aug. 10, 1943 |